United States Patent

[11] 3,573,634

[72] Inventor Todd L. Rachel
Elmira, N.Y.

[21] Appl. No. 757,314
[22] Filed Sept. 4, 1968
[45] Patented Apr. 6, 1971
[73] Assignee Bell Telephone Laboratories, Incorporated
Murray Hill, Berkeley Heights, N.J.

[54] TIMING OF REGENERATOR AND RECEIVER APPARATUS FOR AN UNRESTRICTED DIGITAL COMMUNICATION SIGNAL
5 Claims, 1 Drawing Fig.

[52] U.S. Cl. .......... 328/63, 178/69.5, 179/15, 307/269, 328/72, 328/223
[51] Int. Cl. .......... H03k 5/00
[50] Field of Search .......... 307/269; 328/63, 72, 223; 178/69.5; 179/15 (sync)

[56] References Cited
UNITED STATES PATENTS

| | | | |
|---|---|---|---|
| 2,992,341 | 7/1961 | Andrews, Jr. et al. | 307/269 |
| 3,136,861 | 6/1964 | Mayo | 179/15 |
| 3,189,835 | 6/1965 | Marsh, Jr. | 328/63 |

*Primary Examiner*—Stanley D. Miller, Jr.
*Attorneys*—R. J. Guenther and E. W. Adams, Jr.

ABSTRACT: A dedicated burst of timing pulses is multiplexed in each frame of an unrestricted digital signal to supply timing information to receiver and regenerator circuits in a time division communication system. When the burst appears in the received signal the output of a tuned RLC circuit builds up to a threshold level. A threshold detector then triggers a time control circuit, which in one embodiment of the invention is a counter circuit and in another embodiment of the invention is a pair of monostable multivibrator circuits, to gate the digital signal to a timing recovery circuit for the duration of the burst.

INVENTOR
T. L. RACHEL
BY Leonard M. Quidd
ATTORNEY

TIMING OF REGENERATOR AND RECEIVER APPARATUS FOR AN UNRESTRICTED DIGITAL COMMUNICATION SIGNAL

BACKGROUND OF THE INVENTION

In time divided communication systems well known in the art, the information signal is first transformed into a digital code and then transmitted as a coded pulse train. One of the chief advantages of this transmission method is that the pulse code may be received, regenerated, and amplified at periodic points along the transmission line without the addition of noise components which are associated with analog methods of transmission. In order to receive and regenerate a time divided pulse signal, however, accurate information as to the rate of the pulse signal must be supplied to the regenerator circuits.

In many systems in the prior art timing information for the regenerating apparatus is supplied directly in the coded information signal by means of special code schemes. While these schemes have been found effective, the specially coded pulse signals, known as restricted signals, are inefficient because the transmitted code must be redundant in order to carry the timing information. As a result higher pulse rates are needed to transmit given amounts of information.

Another method which is to be considered here is to supply the timing information during dedicated timing intervals within an unrestricted pulse train. In practical systems, the coded pulse train is divided into time frames having a predetermined duration. A short interval at the beginning of each frame is set aside for timing pulses while the remainder of the frame carries the coded information pulses. The use of this short interval is sufficient to supply enough timing information for the entire frame. In the transmission art the separation of a single time frame into a number of smaller time intervals for transmission of separate information is known as time division multiplexing.

The advantage of the above method is that the timing information may be accurately supplied with dedicated timing pulses in a short interval without restricting the transmitted pulse code. Because the transmitted code is unrestricted, it is more efficient so that a greater amount of the information is transmitted in the signal at any given pulse rate.

The problem associated with the use of the dedicated timing pulses is that the timing pulses must be separately detected and gated to the proper timing recovery circuits at each intermediate regenerator or ultimate receiver. This problem of detecting and gating the timing pulses becomes especially troublesome in high-speed digital communication systems wherein the pulse rate may be in excess of 300 million pulses per second.

Accordingly, it is the object of the present invention to time high-speed receiver and regenerator apparatus by detecting the gating a dedicated burst of timing pulses in an unrestricted digital signal.

This objective is attained as described below by means of analog detection circuitry which is simple, efficient and capable of operation at speeds in excess of 300 million pulses per second.

SUMMARY OF THE INVENTION

In the present invention a dedicated timing burst is multiplexed into the transmitted signal at the beginning of each frame. The first portion of the burst contains a series of pulses, which provide a setup interval for the detection apparatus. The remaining portion of the burst contains the timing pulses, which provide the timing information for the regenerator and receiver circuits. It is this portion of the burst, containing the timing pulses, that is detected by analog means and gated to the appropriate timing recovery circuit.

In accordance with the present invention the timing burst is detected with a tuned RLC circuit and a threshold detector. The tuned RLC circuit and the timing recovery circuit, which receive incoming digital signals, are each controlled by a control gate. During the initial startup period the gate controlling the tuned RLC circuit is open and the gate controlling the timing recovery circuit is closed. After the startup period a control circuit activates both gates so that they are opened only when the actual timing pulses appear in the digital signal.

Briefly, the first series of pulses in the timing burst discharge the tuned RLC circuit to a predetermined ground potential to prepare it for reception of the timing pulses. In response to the timing pulses the output of the tuned RLC circuit rises sufficiently from its ground potential to trigger the threshold detector. The output pulse from the threshold detector signals the control circuit that a predetermined portion of the timing burst has occurred.

In one embodiment of the invention the control circuit responds to the signal from the threshold detector to anticipate the beginning of the next timing burst and enable both control gates. When the gates are enabled the timing pulses in the next burst are passed to the tuned RLC circuit and timing recovery circuit. Thus, in this case the control circuit is triggered only after a predetermined portion of a burst so that the immediately detected burst is not gated to the timing recovery circuit.

In another embodiment of the invention a delay is included in the transmission path to the timing recovery circuit so that the timing pulses in the immediately detected burst are gated to the timing recovery circuit in response to a signal from the control circuit.

DETAILED DESCRIPTION

Figure 1:
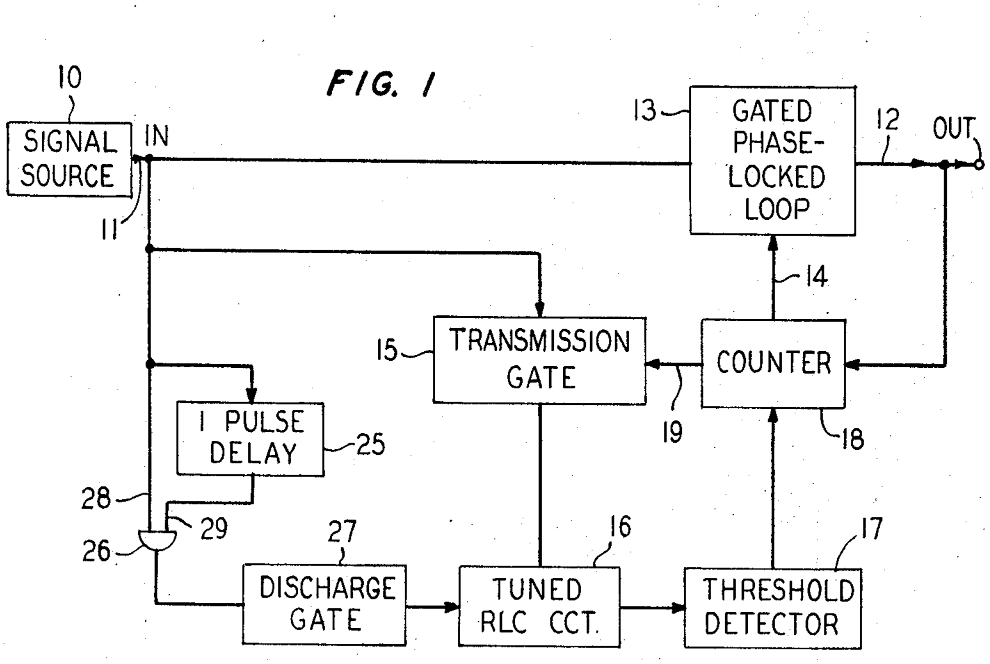
FIG. 1 is a block diagram of timing and detection apparatus embodying the present invention.

In the embodiment of the invention shown in FIG. 1, a multilevel digital signal from source 10 is applied at input 11. The signal from source 10 in a complete system represents the signal received from a distant transmitter or regenerator circuit. The signal at output 12 is a timing signal which has a predetermined frequency relationship to the signal from source 10 and which is used to time the immediate regenerator and/or receiver circuits.

For purposes of illustration, each frame of information in the digital signal from source 10 in FIG. 1 may be considered to contain 120 coded pulses. The digital signal is unrestricted and each pulse may for purposes of illustration be any one of four levels, ±3, ±1, −1, −3. Also by way of illustration a 12 pulse-timing burst appears in the signal from source 10 at the beginning of each frame. In practice, such a burst is multiplexed in the digital signal at the distant transmitter represented by source 10. In the illustrative embodiment shown in FIG. 1, the first four pulses of the burst are +3 pulses which provide a setup interval for the detection apparatus. The remaining eight pulses in the timing burst are alternating −3 and +3 pulses respectively, which provide the actual timing information for the timing recovery operation performed by gated phase-locked loop circuit 13.

Delay element 25, AND gate 26 and discharge gate 27, described in detail below, operate in response to the first four +3 pulses in each timing burst to discharge tuned RLC circuit 16 to a predetermined ground potential in anticipation of the timing pulses. For the most part the function of the remainder of the circuitry shown in FIG. 1 is to detect the eight-timing pulses in each timing burst and provide a gating signal in lead 14 coincident with the eight-timing pulse interval.

The digital signal from pulse source 10 is transmitted through transmission gate 15 to tuned RLC circuit 16. In response to the first four +3 pulses in the timing burst tuned RLC circuit 16 is discharged to a predetermined ground potential through discharge gate 27. Tuned RLC circuit 16 then resonates with the −3, +3 pulse combination of the remaining eight timing pulses of the burst such that its output builds up to a predetermined threshold level at the instant that the +3 pulse appears in the fourth −3, +3 pulse combination at the end of the burst. When tuned RLC circuit 16 builds up to the predetermined threshold level, threshold detector 17 activates counter circuit 18.

The signal from threshold detector 17 indicates that the end of the burst has occurred and causes counter circuit 18 to begin a counting cycle to anticipate the eight timing pulses in the next burst. Since each frame has 120 pulse slots, counter circuit 18 counts 112 pulse slots to complete the counting cycle in anticipation of the eight timing pulses in the next burst. At the end of this predetermined counting cycle, counter circuit 18 sends an eight-pulse slot-gating signal in control lead 14 to activate gated phase-locked loop circuit 13.

Gated phase-locked loop circuit 13, well known in the art, contains a voltage-controlled oscillator which generates a continuous timing signal at output 12. For purposes of illustration, this signal at output 12 may be considered to be equal to one-half the pulse rate of the timing pulses in the information pulse train from source 10. With this scheme one cycle of the timing signal at output 12 is completed in an interval equal to the period of the −3, +3 pulse combination of the timing pulses. The frequency of the signal from the voltage-controlled oscillator is determined by the amplitude of a control signal in the forward path of gated phase-locked loop circuit 13. This control signal is adjusted by the input pulse signal from source 10 when the gating signal appears in lead 14 from counter circuit 18. One well-known method of providing this gated control signal for the voltage-controlled oscillator is to connect a sample and hold circuit in the forward path of gated phase-locked loop circuit 13 so that the control signal is adjusted only when the sample and hold circuit is activated by the gating signal in lead 14. In this manner the amplitude of the control signal for the voltage-controlled oscillator is determined only by the rate of the eight timing pulses which occur at the time that the gating signal activates the sample and hold circuit.

After counter circuit 18 provides the eight-pulse slot-gating signal at lead 14 it sends an inhibit signal through lead 19 to disable transmission gate 15 for approximately an 111 pulse slot interval. This inhibit signal prevents the information signal from source 10 from activating tuned RLC circuit 16 and threshold detector 17 at an improper interval. Should there be an improper startup of counter circuit 18 from an incorrect excitation of tuned RLC circuit 16 and threshold detector 17, the above gating cycle will end because the −3, +3 pulse combination will not occur at the expected interval. Once a correct startup cycle occurs, however, the inhibit signal for gate 15 is synchronized with the information signal so that a continuous operation is insured.

As indicated above, delay circuit 25, AND gate 26 and discharge gate 27 are activated by the four successive +3 pulses at the beginning of the timing burst to prepare tuned RLC circuit 16 for the reception of the eight timing pulses. Whenever two +3 pulses occur simultaneously in the digital signal from source 10, inputs 28 and 29 of AND gate 26 are excited simultaneously. This occurs because the first +3 pulse will be delayed one pulse interval by delay circuit 25 and appear at input 29 at the same time that the second +3 pulse arrives from source 10 directly at input 28. When input leads 28 and 29 are activated simultaneously, AND gate 26 is enabled and discharge gate 27 is activated.

Discharge gate 27, a simple diode bridge or Lewis gate, well known in the prior art, is connected across the output of tuned RLC circuit 16. While discharge gate 27 is enabled the output of tuned RLC circuit 16 is connected to a predetermined ground potential, and while discharge gate 27 is disabled, tuned RLC circuit 16 is allowed to resonate with the signal appearing through transmission gate 15 from source 10. Thus, the signal from AND gate 26 functions to discharge the tuned RLC circuit whenever two +3 pulses occur in succession Four pulses are used in the discharge interval in order to allow sufficient time for the tuned RLC circuit to be discharged to the predetermined ground potential. This discharge operation insures that the output of tuned RLC circuit builds up to the threshold level of detector 17 at the end of the eight timing pulses. It may be noted, of course, that tuned RLC circuit 16 will be discharged in response to the information signal whenever two +3 pulses occur in the pulse code, but this periodic discharging has no effect on the detection capabilities of the tuned RLC circuit 16 because it is only critical that it build up at the time when the eight timing pulses appear in the digital signal. As may be appreciated, the eight timing pulses will not trigger discharge gate 27 because they are alternating −3 and +3 pulses.

Figure 2:
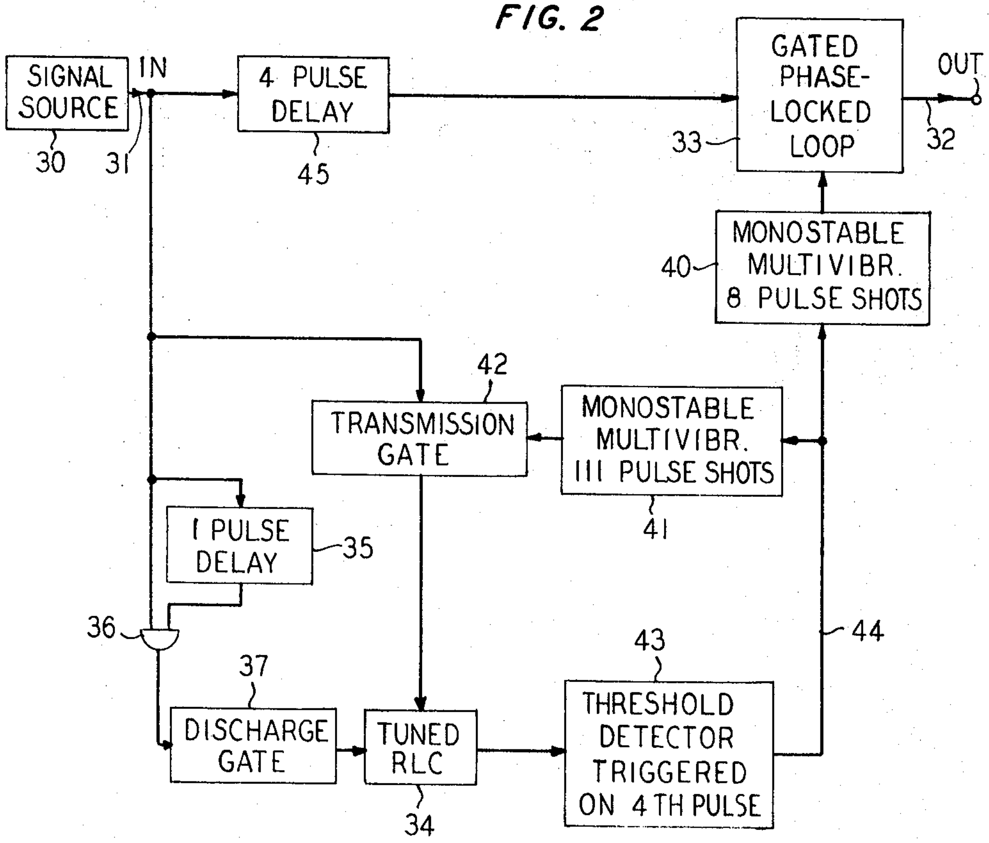
FIG. 2 is a block diagram of timing and detection apparatus in accordance with an alternative embodiment of the invention.

The alternative embodiment of the present invention shown in FIG. 2 generally operates in the same manner as described with respect to the circuit in FIG. 1. The transmission scheme used in FIG. 2 is identical to that used in FIG. 1 in that an unrestricted digital signal having a 120 pulse slot frame with 12-pulse timing-birst is applied at input 31 from source 30. The signal at output 32 from gated phase-locked loop 33 is matched to the rate of the signal from source 30 to provide timing information for the immediate regenerator and receiver circuits.

The function of gated phase-locked loop circuit 33, tuned RLC circuit 34, delay circuit 35, AND gate 36 and discharge gate 37 is identical to the function of gated phase-locked loop circuit 13, tuned RLC circuit 16, delay circuit 25, NAND gate 26 and discharge gate 27, respectively, shown in FIG. 1. In the circuit shown in FIG. 2, however, delay circuit 45 is added in the transmission path from source 30 to gated phase-locked loop circuit 33; threshold detector 43 is triggered on the fourth timing-pulse in the timing burst instead of the eighth timing pulse; and counter circuit 18 in FIG. 1 is replaced by monostable multivibrator circuits 40 and 41 to provide the gating signal to gated phase-locked loop circuit 33 and the inhibit signal to transmission gate 42.

Initially, as with the circuit shown in FIG. 1, transmission gate 42 is open to permit the digital signal from source 30 to appear at tuned RLC circuit 34. In response to the eight timing pulses in the timing burst, the tuned RLC circuit builds up to a predetermined threshold level from a predetermined ground potential in the same manner as tuned RLC circuit 16 in FIG. 1. The voltage at the output of tuned RLC circuit 34, however, builds up to the predetermined threshold level of detector 43 when the fourth timing-pulse appears in the digital signal. This fourth pulse is a +3 pulse which occurs at the end of the second pulse −3, +3 combination in the timing burst.

When threshold detector 43 is activated a pulse is sent through lead 44 to trigger monostable multivibrator 40. At the instant that the pulse appears in lead 44 monostable multivibrator circuit 40 generates an eight-pulse slot-gating signal for gated phase-locked loop circuit 33. Four pulse delay circuit 45 between input 31 and gated phase-locked loop circuit 33, insures that the eight timing pulses will appear at the gated phase-locked loop circuit 33 at the same time that the gating signal appears from monostable multivibrator circuit 40. In effect, the four pulse delay of delay circuit 45 offsets the four pulse delay that occurs in detecting the timing pulses in threshold detector 43 so that the immediately detected burst is gated to gated phase-locked loop 33. At the end of the eight-pulse slot-timing interval monostable multivibrator circuit 40 returns to its original stable state so that the control signal in gated phase-locked loop circuit 33 is not affected by the information signal from input 31.

Monostable multivibrator circuit 41 is also triggered by the pulse from threshold detector 43 and is timed to inhibit transmission gate 42 from the time one timing burst is detected to the time when the next burst arrives so that the tuned RLC circuit 34 and threshold detector 43 will not be activated at an improper interval from a chance combination of information pulses. An inhibit signal having approximately a 111 pulse slot duration is sufficient to perform this function, although for closer tolerances the interval can be increased to 114 pulse slots. The same startup procedure that was described in conjunction with counter circuit 18 in FIG. 1 also applies with respect to monostable multivibrator circuit 41 shown in FIG. 2.

In conclusion, it should be understood that the above described embodiments are merely illustrative of applications of the principles of the invention. Numerous other arrangements may be devised by those skilled in the art without departing from the spirit and scope of the invention.

I claim:

1. In combination:

a source of an input digital signal having a plurality of timing pulses which occur in groups at predetermined intervals in said digital signal;

a tuned circuit connected to receive said digital signal for producing an output signal which reaches a predetermined threshold level in response to the reception of a predetermined number of said timing pulses in each of said groups in said digital signal;

a threshold circuit connected to receive the output signal from said tuned circuit for generating an output signal when the output of said tuned circuit reaches said predetermined threshold level;

a timing recovery circuit for providing an output signal at a predetermined frequency with respect to said input digital signal including first gating means for controlling said timing recovery circuit so that the frequency of said output signal is adjusted only when said first gating means is activated;

second gating means for controlling the transmission of said digital signal to said tuned circuit;

means responsive to said threshold circuit for activating said first gating means in the presence of said groups of timing pulses so that the frequency of said output signal is determined by said timing pulses; and means responsive to said threshold circuit for providing an inhibit signal to said second gating means when said groups of timing pulses in said digital signal are absent.

2. In combination:

a source of an input digital signal divided into time frames having a predetermined burst of timing pulses multiplexed in each frame, each of said bursts having first and second groups of pulses;

a tuned circuit connected to receive said digital signal;

discharge means responsive to said first group of pulses in each of said bursts for discharging said tuned circuit to a predetermined reference potential, said tuned circuit rising from said reference potential to a predetermined threshold level in response to a predetermined plurality of timing pulses in said second group of pulses in each of said bursts;

a threshold circuit for generating an output signal when the output of said tuned circuit reaches said predetermined threshold level;

a timing recovery circuit for providing an output signal at a predetermined frequency with respect to said input digital signal including first gating means for controlling said timing recovery circuit so that said frequency of said output signal is adjusted only when said first gating means is activated;

second gating means for controlling the transmission of said digital signal to said tuned RLC circuit;

means responsive to said threshold circuit for activating said first gating means in the presence of said second group of pulses in each of said bursts so that the frequency of said output signal of said timing recovery circuit is determined by said group of pulses; and means responsive to said threshold circuit for providing an inhibit signal to said second gating means when said second group of pulses in each of said bursts is absent 3. Apparatus in accordance with claim 2 wherein said means for providing said inhibit signal to said second gating means and said means for activating said first gating means in a counter circuit which provides said inhibit signal for said second gating means in a first frame and which anticipates the burst occurring in a second succeeding frame in said digital signal to activate said first gating means in said timing recovery circuit.

4. Apparatus in accordance with claim 2 wherein said discharge means includes a delay element, a logic gate and a discharge gate, said delay element and said logic gate combining to detect said first group of pulses in said burst and said discharge gate being responsive to said delay element and said logic gate to discharge said tuned circuit.

5. Apparatus for detecting a dedicated burst of timing pulses in a multilevel digital signal and for gating a portion of said burst to a timing recovery circuit having a variable frequency output signal comprising in combination:

a first gating means included in said timing recovery circuit for controlling said variable frequency output signal so that said variable frequency is adjusted only when said first gating means is activated;

a tuned circuit connected to receive said digital signal;

a second gating means for controlling the transmission of said digital signal to said tuned circuit;

discharge means connected to said tuned circuit and responsive to a first group of pulses in said dedicated burst for discharging said tuned circuit to a predetermined reference potential, said tuned circuit rising from said reference potential to a predetermined threshold level in response to a predetermined number of timing pulses in a second portion of said dedicated burst;

a threshold circuit connected to said tuned circuit for providing an output signal when the output of said tuned circuit reaches said predetermined threshold level;

a delay element for providing a time delay in the transmission path of said digital signal to said timing recovery circuit, said delay being equal to the time said tuned circuit takes to reach said predetermined threshold level from said reference potential;

a first monostable multivibrator circuit responsive to said signal from said threshold circuit for directly activating said first gating means in the presence of said second group of pulses in said burst so that the frequency of said signal from said timing recovery circuit is controlled by said pulses; and a second monostable multivibrator circuit responsive to said signal from said tuned circuit for inhibiting said second gating means for a predetermined interval when said second group of pulses in said timing burst is absent.